(12) United States Patent
Kim et al.

(10) Patent No.: US 8,786,221 B2
(45) Date of Patent: Jul. 22, 2014

(54) METHOD FOR CONTROLLING PERMANENT MAGNET SYNCHRONOUS MOTOR

(75) Inventors: Bum Sik Kim, Gyeonggi-Do (KR); Young Kook Lee, Seoul (KR); Jin Hwan Jung, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 444 days.

(21) Appl. No.: 12/829,638

(22) Filed: Jul. 2, 2010

(65) Prior Publication Data
US 2011/0241578 A1   Oct. 6, 2011

(30) Foreign Application Priority Data

Mar. 31, 2010   (KR) .................. 10-2010-0029169

(51) Int. Cl.
*H02P 21/14*   (2006.01)
*H02P 6/00*   (2006.01)

(52) U.S. Cl.
USPC ............ 318/400.02; 318/400.01; 318/400.06; 318/400.7; 318/400.12; 318/400.16; 318/400.15

(58) Field of Classification Search
CPC ... H02P 21/14; Y02T 10/643; Y02T 10/7258; Y02T 10/7005; Y02T 10/6217; Y02T 10/705; Y02T 10/7077; Y02T 10/6239; Y02T 10/6286; Y02T 10/646; Y02T 10/648; Y02T 10/7044; Y02T 90/16; Y02T 10/70
USPC ............... 318/400.02, 812, 807, 610, 400.15, 318/400.14, 400.01, 798, 799, 800, 700; 320/104, 143, 140
See application file for complete search history.

(56) References Cited

U.S. PATENT DOCUMENTS

| | | | |
|---|---|---|---|
| 4,263,543 A | 4/1981 | Watrous et al. | |
| 5,617,014 A | 4/1997 | Danstrom | |
| 6,329,781 B1 * | 12/2001 | Matsui et al. | 318/717 |
| 6,986,688 B1 * | 1/2006 | Jansen | 440/1 |
| 7,256,563 B2 * | 8/2007 | Kuehner et al. | 318/432 |
| 7,259,530 B2 * | 8/2007 | Ochiai et al. | 318/105 |
| 7,548,035 B2 * | 6/2009 | Endo et al. | 318/432 |

(Continued)

FOREIGN PATENT DOCUMENTS

| | | |
|---|---|---|
| JP | 07-096804 A | 4/1995 |
| JP | 09-098595 A | 4/1997 |

(Continued)

*Primary Examiner* — Rita Leykin
(74) *Attorney, Agent, or Firm* — Edwards Wildman Palmer LLP; Peter F. Corless (57) ABSTRACT

A method for controlling a permanent magnet synchronous motor includes detecting an absolute angular position and using the angular position to calculate a rotational speed of the motor; detecting a voltage of a battery as a power source; calculating a compensated speed from a rotational speed of the permanent magnet synchronous motor based on a torque command, the rotational speed of the permanent magnet synchronous motor, and the battery voltage; generating a d-axis current command and a q-axis current command corresponding to the torque command and the compensated speed; calculating a d-axis voltage command and a q-axis voltage command based on the d-axis current command and the q-axis current command; converting the d-axis voltage command and the q-axis voltage command into three-phase voltage commands based on the detected absolute angular position; and controlling the operation of the permanent magnet synchronous motor based on the three-phase voltage commands.

6 Claims, 4 Drawing Sheets

(56) References Cited

U.S. PATENT DOCUMENTS

| | | |
|---|---|---|
| 7,715,971 B2 * | 5/2010 | Okuda et al. .................... 701/93 |
| 7,772,790 B2 * | 8/2010 | Nashiki .................... 318/400.02 |
| 7,928,686 B2 * | 4/2011 | Saha et al. .................... 318/807 |
| 7,956,560 B2 * | 6/2011 | Izumi et al. .................... 318/376 |
| 8,080,957 B2 * | 12/2011 | Miura et al. ............. 318/400.23 |
| 8,084,977 B2 * | 12/2011 | Hashimoto .................. 318/432 |
| 8,164,287 B2 * | 4/2012 | Yamada et al. .......... 318/400.14 |
| 8,427,087 B2 * | 4/2013 | Yamada .................. 318/400.02 |
| 2005/0078423 A1 | 4/2005 | Kim |
| 2011/0006723 A1 * | 1/2011 | Yamakawa et al. .......... 318/812 |

FOREIGN PATENT DOCUMENTS

| | | |
|---|---|---|
| JP | 2002-281794 A | 9/2002 |
| JP | 2006-180658 A | 7/2006 |
| JP | 2008-189090 A | 8/2008 |
| KR | 2000-0008221 | 7/2000 |

* cited by examiner

FIG.4 ly, to a method for controlling a motor. More particularly, it relates to a method for controlling a permanent magnet synchronous motor that is used in electric vehicles such as hybrid vehicles, fuel cell vehicles, and the like.

METHOD FOR CONTROLLING PERMANENT MAGNET SYNCHRONOUS MOTOR

CROSS-REFERENCE TO RELATED APPLICATION

This application claims under 35 U.S.C. §119(a) the benefit of Korean Patent Application No. 10-2010-0029169 filed Mar. 31, 2010, the entire contents of which are incorporated herein by reference.

BACKGROUND (a) Technical Field

The present disclosure relates, generally, to a method for controlling a motor. More particularly, it relates to a method for controlling a permanent magnet synchronous motor that is used in electric vehicles such as hybrid vehicles, fuel cell vehicles, and the like.

(b) Background Art

A permanent magnet synchronous motor (PMSM) is a high-power and high-efficiency motor that is widely used in the fields of electric vehicles including hybrid vehicles, fuel cell vehicles, and the like, as well as other industries.

In particular, an interior permanent magnet synchronous motor (IPMSM) is a synchronous motor having a permanent magnet inserted into a rotor iron core. The IPMSM has excellent high-speed durability and drivability, and thus is suitable for use as an electric vehicle motor.

Figure 1:
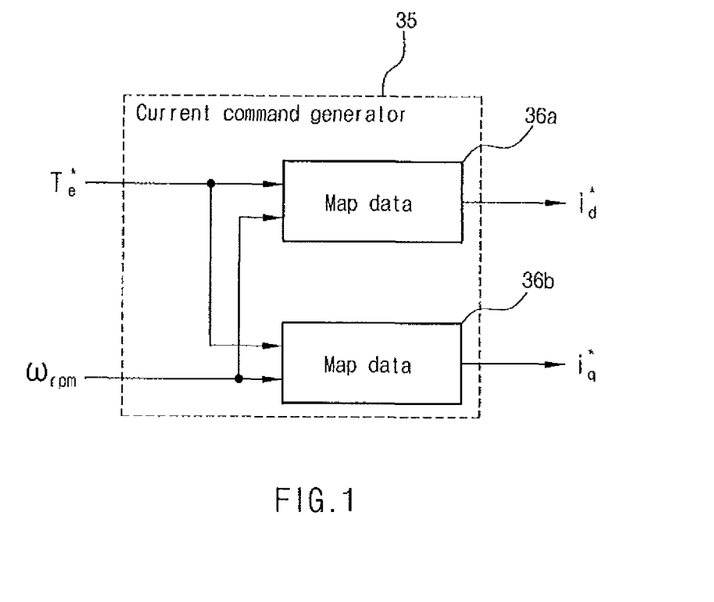
FIG. 1 is a schematic diagram showing a conventional current command generator for generating current commands.

As shown in FIG. 1, according to a conventional method for controlling a permanent magnet synchronous motor, a current command generator 35 receives a torque command $T_e^*$ and a rotational speed $\omega_{rpm}$ of the permanent magnet synchronous motor and generates a d-axis current command $i_d^*$ and a q-axis current command $i_q^*$ based on current command map data 36a and 36b.

When the current command generator 35 outputs the generated d-axis and q-axis current commands $i_d^*$ and $i_q^*$, a current controller (not shown) generates d-axis and q-axis voltage commands $V_d^*$ and $V_q^*$ based on the d-axis and q-axis current commands $i_d^*$ and $i_q^*$. Thereafter, the permanent magnet synchronous motor is suitably controlled by the generation of three-phase voltage commands $V_u^*$, $V_v^*$ and $V_w^*$ and by pulse width modulation (PWM) and three-phase current control of an inverter.

Conventionally, however, a predetermined current command is suitably generated and the torque at the corresponding motor speed is suitably generated according to the torque command and the motor rotational speed based on a predetermined reference voltage map regardless of the voltage of a battery as a power source of the motor, i.e., based on a map set at the lowest DC link voltage which meets the output specifications of the motor.

Therefore, the battery voltage variation cannot be reflected in real time, which suitably reduces the voltage utilization of the inverter when the battery voltage increases during operation.

Particularly, in the electric vehicles such as hybrid vehicles, fuel cell vehicles, and the like, since the battery voltage during operation of a vehicle drive motor is suitably higher than the reference voltage at which the map is set, the generation of the current command based on the map set at the reference voltage is disadvantageous in terms of the use of voltage and current.

Accordingly, it is possible to perform linear interpolation using a current command map for each voltage step up to the maximum voltage which is suitably generated while driving a vehicle. However, it requires a large data storage as well as considerable time and effort.

Accordingly, there remains a need in the art for methods for controlling a permanent magnet synchronous motor used in electric vehicles.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for controlling a permanent magnet synchronous motor used in electric vehicles such as hybrid vehicles, fuel cell vehicles, and the like, which can reflect a battery voltage variation in real time.

In certain preferred embodiments, the present invention provides a method for controlling a permanent magnet synchronous motor, in which a battery voltage variation is suitably compensated in real time to improve the voltage utilization of a motor-inverter system and, in turn, suitably improve the fuel efficiency of the vehicle.

In a preferred embodiment, the present invention provides a method for suitably controlling a permanent magnet synchronous motor, the method preferably including detecting an absolute angular position of a permanent magnet synchronous motor; suitably calculating a rotational speed of the permanent magnet synchronous motor based on the detected absolute angular position; suitably detecting a voltage of a battery as a power source; suitably calculating a compensated speed, for which a battery voltage variation is compensated, from the rotational speed of the permanent magnet synchronous motor based on a torque command, the rotational speed of the permanent magnet synchronous motor, and the battery voltage; generating a d-axis current command and a q-axis current command corresponding to the torque command and the compensated speed using a predetermined current command map; converting three-phase currents flowing into the permanent magnet synchronous motor into a d-axis feedback current and a q-axis feedback current based on the detected absolute angular position; suitably calculating a d-axis voltage command and a q-axis voltage command based on the d-axis current command, the q-axis current command, the d-axis feedback current, and the q-axis feedback current; converting the d-axis voltage command and the q-axis voltage command into three-phase voltage commands based on the detected absolute angular position; and controlling the operation of the permanent magnet synchronous motor based on the three-phase voltage commands.

In a preferred embodiment, the step of calculating the compensated speed may preferably include determining whether the rotational speed of the permanent magnet synchronous motor is greater than a predetermined weight application speed; suitably calculating an operating weight factor by applying a weight to the rotational speed and the torque command, if the rotational speed of the permanent magnet synchronous motor is greater than the weight application speed; and suitably calculating the compensated speed, for which a battery voltage variation is compensated, from the rotational speed of the permanent magnet synchronous motor based on the operating weight factor and a reference voltage used when the current command map is set.

In another preferred embodiment, the operating weight factor may be calculated by the following equation E1 based on predetermined weight factor of speed and weight factor of torque command:

$$K_N = K_\omega(\omega_{rpm} - \omega_0) + K_T|T_e^*| \qquad \text{E1:}$$

wherein $K_N$ represents the operating weight factor, $K_\omega$ represents the weight factor of speed, $\omega_{rpm}$ represents the motor rotational speed, $\omega_0$ represents the weight factor of application start speed, $K_T$ represents the weight factor of torque command, and $T_e^*$ represents the torque command.

In still another preferred embodiment, the operating weight factor is zero if the rotational speed of the permanent magnet synchronous motor is suitably smaller than the weight application speed.

In yet another preferred embodiment, the step of calculation the compensated speed may further include determining whether the battery voltage is greater than a predetermined compensation starting voltage, wherein if the battery voltage is greater than the compensation starting voltage, the compensated speed may be suitably calculated and used as an input of the current command map data, and if the battery voltage is smaller than the compensation starting voltage, the rotational speed of the permanent magnet synchronous motor may be used as an input of the current command map data instead of the compensated speed.

In still yet another preferred embodiment, the compensated speed may be calculated by a motor speed normalization formula in which the operating weight factor, the battery voltage, and the rotational speed of the permanent magnet synchronous motor are used as input variables.

In a further preferred embodiment, the compensated speed may be a normalized motor speed calculated by the motor speed normalization formula represented by the following equation E2:

$$\omega_{rpm,Nom} = \left[1 + F\left\{(1 + K_N)\frac{V_{DC,MAP}}{V_{DC}} - 1\right\}\right]\omega_{rpm} \qquad \text{E2}$$

wherein $\omega_{rpm,Nom}$ represents the normalized motor speed, $K_N$ represents the operating weight factor, $V_{DC,MAP}$ represents the reference voltage used when the map is set, $V_{DC}$ represents the battery voltage, and F is equal to $1(V_{DC} \geq V_0)$ or $0(V_{DC} < V_0)$, in which, $V_{DC}$ represents the battery voltage and $V_0$ represents the compensation start voltage.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

11: permanent magnet synchronous motor
13: PWM inverter
15: space vector pulse width modulation algorithm module
17: position detector          19: current detector
21: battery                    23: voltage detector
31: angular speed calculator
33: three-phase/d-q coordinate converter
35: current command generator   35a: voltage variation compensator
37: current controller
39: d-q/three-phase coordinate converter It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a method for controlling a permanent magnet synchronous motor, the method comprising detecting an absolute angular position of a permanent magnet synchronous motor, calculating a rotational speed of the permanent magnet synchronous motor based on the detected absolute angular position, detecting a voltage of a battery as a power source, calculating a compensated speed, wherein a battery voltage variation is compensated from the compensated speed, generating a d-axis current command and a q-axis current command corresponding to the torque command and the compensated speed using a predetermined current command map, converting three-phase currents flowing into the permanent magnet synchronous motor into a d-axis feedback current and a q-axis feedback current based on the detected absolute angular position, calculating a d-axis voltage command and a q-axis voltage command based on the d-axis current command, the q-axis current command, the d-axis feedback current, and the q-axis feedback current, converting the d-axis voltage command and the q-axis voltage command into three-phase voltage commands based on the detected absolute angular position, and controlling the operation of the permanent magnet synchronous motor based on the three-phase voltage commands.

In one embodiment, the compensated speed is calculated from the rotational speed of the permanent magnet synchronous motor based on a torque command, the rotational speed of the permanent magnet synchronous motor, and the battery voltage.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Symbols used in the specification and drawings are defined as follows:

| | |
|---|---|
| $T_e^*$: torque command | $V_d^*$: d-axis voltage command |
| $V_q^*$: q-axis voltage command | $i_d^*$: d-axis current command |
| $i_q^*$: q-axis current command | $i_d$: d-axis feedback current |
| $i_q$: q-axis feedback current | |
| $V_u^*, V_v^*, V_w^*$: three-phase voltage commands | |
| $D_u, D_v, D_w$: duties for switch control signals of inverter | |
| $V_{DC}$: battery voltage (DC link voltage) | |
| $i_{us}, i_{vs}, i_{ws}$: three-phase currents | $\omega_{rpm}$: motor rotational speed |
| $\omega_0$: weight application start speed | $\omega_{rpm,\,Nom}$: normalized motor speed |
| $K_\omega$: weight factor of speed | $K_T$: weight factor of torque command |
| $K_N$: operating weight factor | $V_0$: compensation start voltage |
| F: voltage variation flag | |
| $V_{DC,\,MAP}$: map setting reference voltage (DC voltage during mapping) | |

According to preferred embodiments, the present invention provides a system and method for controlling a permanent magnet synchronous motor, which can reflect a variation in voltage of a battery as a power source of the motor during operation in real time while using an existing reference voltage map, i.e., a map set at a predetermined reference voltage, when a current command is generated according to a motor rotational speed and a requested torque (torque command).

Figure 2:
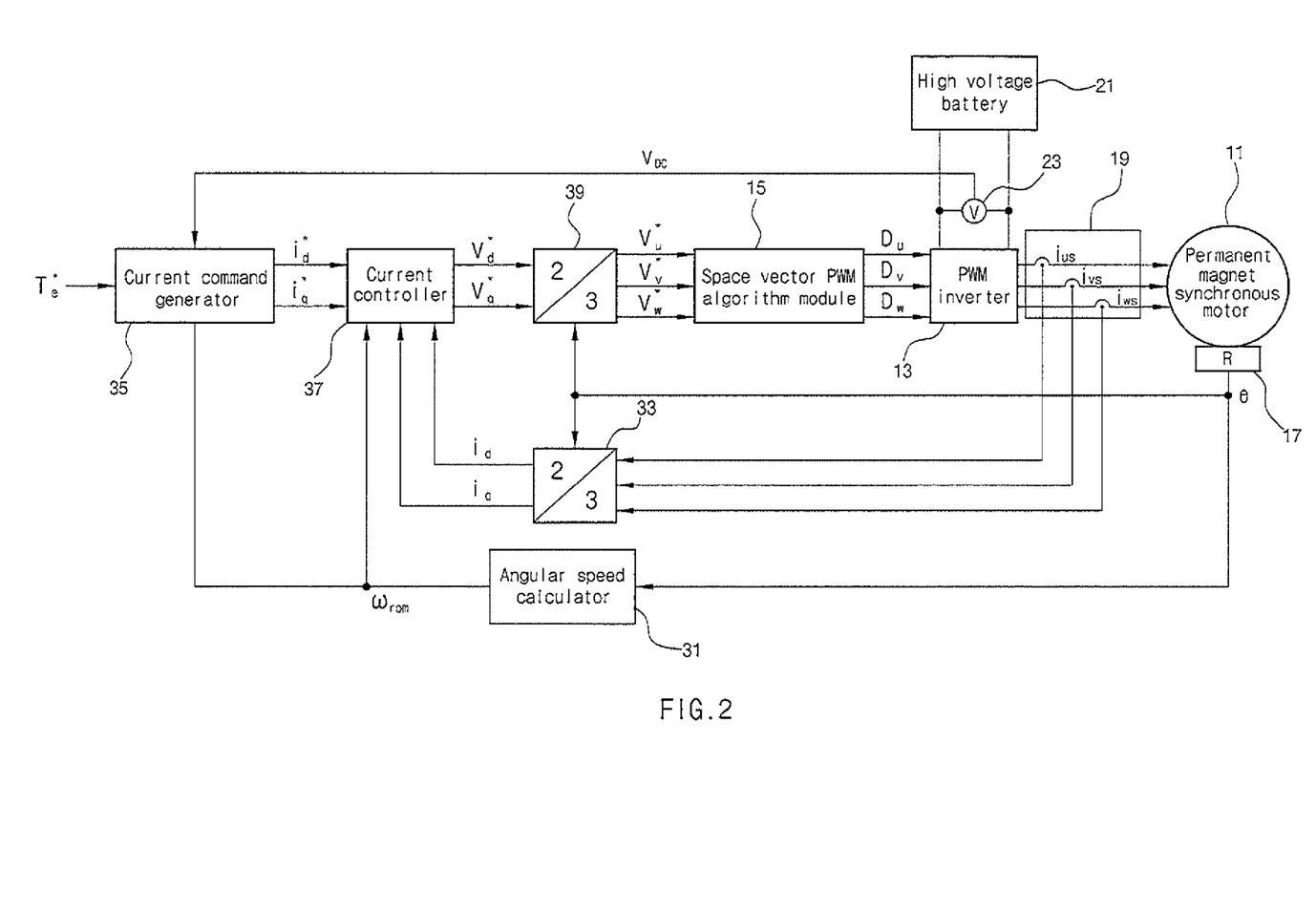
FIG. 2 is a schematic diagram showing a system for controlling a permanent magnet synchronous motor in accordance with an exemplary embodiment of the present invention.

According to certain preferred embodiments and as shown in FIG. 2, for example, reference numeral 11 denotes a permanent magnet synchronous motor. In further preferred embodiments, the permanent magnet synchronous motor may be an interior permanent magnet synchronous motor, for example.

In other further preferred embodiments reference numeral 21 denotes a battery (high voltage battery) used as a power source of the permanent magnet synchronous motor 11. Preferably, the battery 21 supplies a drive power of the motor in an electric vehicle (EV) mode or hybrid electric vehicle (HEV) mode and stores the electrical energy generated by the motor, which operates in a generating mode, in a regenerative braking (RB) mode. According to other further preferred embodiments, in a fuel cell vehicle (with a fuel cell-battery hybrid system), the battery 21 is equipped together with a fuel cell stack (not shown) as a main power source and serves as an auxiliary power source to supply the drive power of the motor.

According to certain exemplary embodiments, reference numeral 13 denotes a PWM inverter which applies a three-phase AC current to the permanent magnet synchronous motor 11. Preferably, the PWM inverter 13 controls a motor application voltage (inverter output voltage) through pulse width modulation (PWM) to control the three-phase currents $i_{us}$, $i_{vs}$ and $i_{ws}$ applied to the motor 11. In further preferred embodiments, the PWM inverter 13 preferably includes a power module (not shown) composed of a semiconductor switch (e.g., IGBT) capable of performing high speed switching and a diode which forms a current loop during power generation.

Preferably, the PWM control method controls the voltage (or current) by suitably varying the width of a switching pulse for switching the semiconductor switch in the inverter and preferably includes a triangular wave comparison PWM method and a space vector PWM method. According to certain exemplary embodiments, FIG. 2 shows an example of the space vector PWM method. The PMW and three-phase control of the inverter are well known to those skilled in the art, and thus a detailed description thereof will be omitted.

According to other preferred embodiments, the control system according to the present invention preferably includes a position detector 17 for detecting an absolute angular position θ of a motor rotor. Preferably, the absolute angular position θ means each angular position in which the current is applied to the permanent magnet synchronous motor 11. According to certain preferred embodiments, the position detector 17 may be a resolver.

According to preferred exemplary embodiments, reference numeral 19 denotes a current detector for detecting each of the phase currents $i_{us}, i_{vs}$ and $i_{ws}$ flowing into the permanent magnet synchronous motor 11 by the output voltage of the PWM inverter 13. Preferably, the phase currents detected by the current detected may be used to control the inverter.

According to further preferred embodiments, the control system according to the present invention monitors the battery voltage variation and suitably reflects it in controlling the motor to compensate for the battery voltage variation in real time. Preferably, a DC link voltage $V_{DC}$ of the inverter is suitably detected and used as a voltage value to monitor the battery voltage variation.

Accordingly, the control system according to the present invention preferably includes a voltage detector 23 for detecting the DC link voltage $V_{DC}$ as the battery voltage. Preferably, the voltage detector 23 may be suitably configured to measure the voltage at both ends of a DC link capacitor (not shown) which absorbs the high frequency ripple component of the DC voltage generated by the operation of the inverter and smoothes the DC voltage. According to other further preferred embodiments, since a map set at the lowest DC link voltage $V_{DC,MAP}$ which meets the output specifications of the motor is used as reference voltage maps 36a and 36b (shown in FIG. 3), it is preferred to detect the DC link voltage $V_{DC}$ through the voltage detector 23 and then use the detected DC link voltage $V_{DC}$ to suitably compensate for the voltage variation.

According to still other further preferred embodiments of the present invention, the control system further preferably includes an angular speed calculator 31 for calculating a motor rotational speed $\omega_{rpm}$ based on the signal of the position detector 17; a three-phase/d-q coordinate converter 33 for calculating a d-axis feedback current $i_d$ and a q-axis feedback current $i_q$ based on the signals of the position detector 17 and the current detector 19; a current command generator 35 for suitably generating a d-axis current command $i_d^*$ and a q-axis current command $i_q^*$, for which the voltage variation is compensated, based on a torque command $T_e^*$ suitably applied from a superior controller, the motor rotational speed $\omega_{rpm}$ input from the angular speed calculator 31, and the signal of the voltage detector 23; a current controller 37 for suitably calculating a d-axis voltage command $V_d^*$ and a q-axis voltage command $V_q^*$, respectively; and a d-q/three-phase coordinate converter 39 for calculating three-phase voltage commands $V_u^*$, $V_v^*$ and $V_w^*$ based on the signal of the position detector 17 and the d-axis voltage command $V_d^*$ and the q-axis voltage command $V_q^*$ input from the current controller 37.

Preferably, the angular speed calculator 31 receives the angular position θ detected by the position detector 17, i.e., resolver, and calculates the motor rotational speed $\omega_{rpm}$ based on the detected angular position θ. Preferably, the angular speed calculator 31 may include a differentiator, for example.

According to still other further preferred embodiments, the three-phase/d-q coordinate converter 33 receives the angular position θ detected by the position detector 17 and the phase currents $i_{us}$, $i_{vs}$, and $i_{ws}$ detected by the current detector 19 and converts the three-phase currents $i_{us}$, $i_{vs}$ and $i_{ws}$ into the d-axis feedback current $i_d$ and the q-axis feedback current $i_q$ using the angular position θ.

Further, the current command generator 35 of the present invention receives the torque command $T_e^*$ applied from the superior controller, the motor rotational speed $\omega_{rpm}$ calculated by the angular speed calculator 31, and the DC link voltage $V_{DC}$ detected by the voltage detector 23 and suitably generates the d-axis current command $i_d^*$ and the q-axis current command $i_q^*$, for which the voltage variation is suitably compensated, using predetermined current command data based on the torque command $T_e^*$, the motor rotational speed $\omega_{rpm}$, and the DC link voltage $V_{DC}$. Preferably, the superior controller may be a typical hybrid control unit HCU which suitably generates and outputs the torque command.

Preferably, the predetermined current command data may be the existing current command data with the torque command and the rotational speed as the input. Preferably, the predetermined current command data includes predetermined d-axis current command data for generating the d-axis current command $i_d^*$ and predetermined q-axis current command data for generating the q-axis current command $i_q^*$, which corresponds to the torque command and the rotational speed.

Preferably, the d-axis current command data and the q-axis current command data are map data for suitably calculating the current commands from the torque command, and the existing d-axis current command map 36a (FIG. 3) and the existing q-axis current command map 36b (FIG. 3) generated at a predetermined reference voltage may be used as they are.

Figure 3:
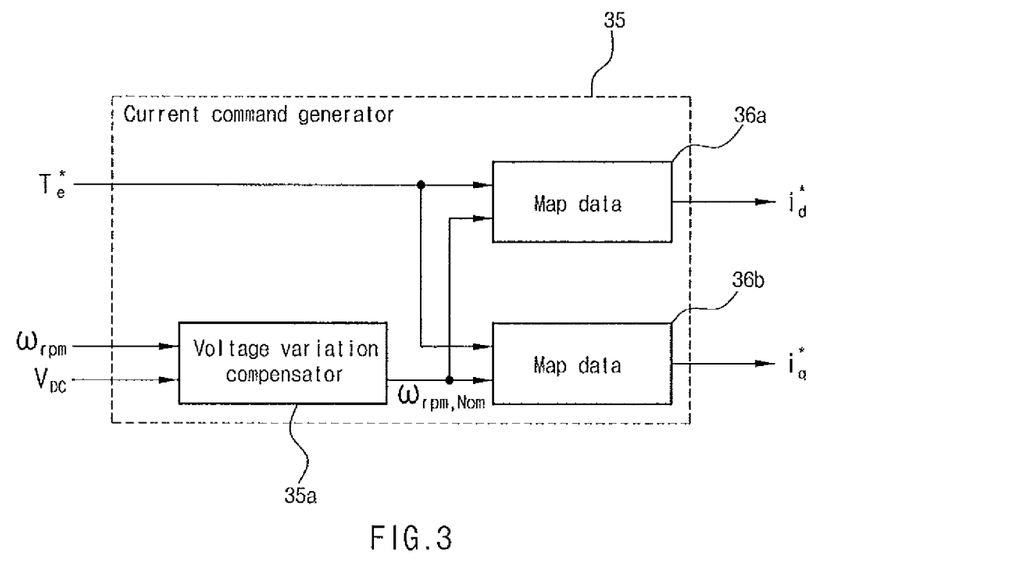
FIG. 3 is a schematic diagram showing a current command generator for generating current commands in accordance with an exemplary embodiment of the present invention.

According to still further preferred embodiments of the present invention, the predetermined d-axis current command map 36a includes a plurality of optimal d-axis current command values suitably mapped with respect to a plurality of torques and a plurality of rotational speeds, respectively, and the predetermined q-axis current command map 36b preferably includes a plurality of optimal q-axis current command values mapped with respect to a plurality of torques and a plurality of rotational speeds, respectively.

According to other further preferred embodiments, the d-axis current command map and the q-axis current command map may be set using data obtained from a previous test. For example, according to certain exemplary embodiments, the d-axis current command map and the q-axis current command map may be set by calculating optimal d-axis current commands and q-axis current commands for each torque and rotational speed using a bi-directional dynamometer through a test and then mapping these values.

Preferably, in order to perform the voltage variation compensation in the above-described manner, the current command generator 35 of the present invention further includes a voltage variation compensator 35a for calculating a compensated motor rotational speed $\omega_{rpmNom}$ based on the torque command $T_e^*$ applied from the superior controller, the motor rotational speed $\omega_{rpm}$ calculated by the angular speed calculator 31, and the DC link voltage (battery voltage) $V_{DC}$ detected by the voltage detector 23 (see FIG. 3).

In detail, the current command generator 35 according to the present invention suitably generates the d-axis and q-axis current commands $i_d^*$ and $i_q^*$ using the d-axis and q-axis current command maps 36a and 36d and further receives the DC link voltage $V_{DC}$, detected in real time, to compensate for the battery voltage variation. Preferably, the voltage variation compensator 35a suitably calculates the compensated motor rotational speed $\omega_{rpm,Nom}$ using the torque command $T_e^*$, the detected motor rotational speed $\omega_{rpm}$, and DC link voltage (battery voltage) $V_{DC}$. Preferably, the compensated motor rotational speed $\omega_{rpm,Nom}$ (hereinafter referred to as "compensated speed") and the torque command $T_e^*$ are used as inputs of the d-axis current command map 36a and the q-axis current command map 36b for suitably generating the current commands.

Consequently, according to preferred embodiments of the present invention, since the d-axis current command $i_d^*$ and the q-axis current command $i_q^*$ are suitably generated by the d-axis current command map 36a and the q-axis current command map 36b based on the torque command $T_e^*$ and the compensated speed $\omega_{rpm,Nom}$, each of the generated current commands suitably corresponds to the current command, for which the voltage variation is compensated.

Figure 4:
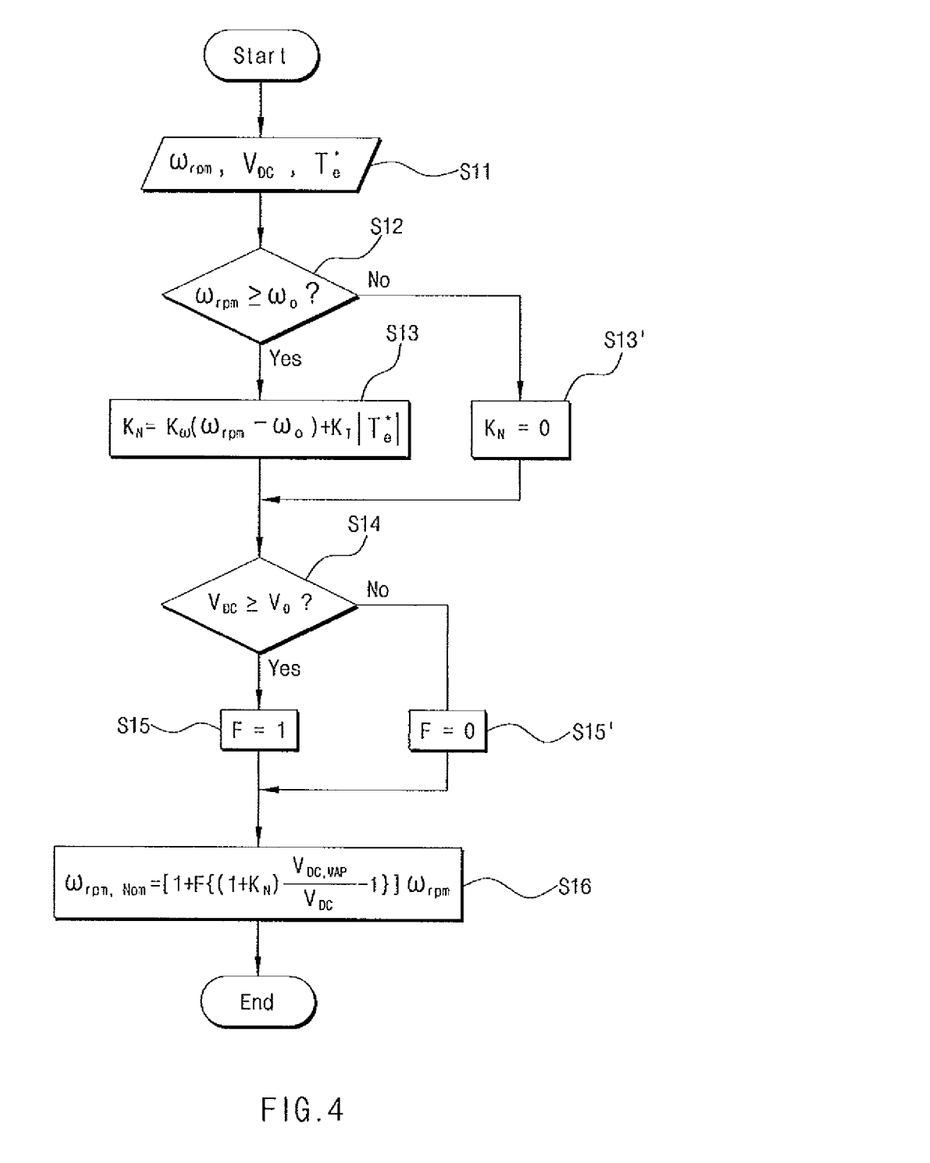
FIG. 4 is a flowchart showing a method for controlling a permanent magnet synchronous motor in accordance with an exemplary embodiment of the present invention.

The process for calculating the compensated speed, i.e., the process of compensating for the voltage variation with respect to the motor rotational speed $\omega_{rpm}$, performed by the voltage variation compensator 35a of the current command generator 35 using the DC link voltage $V_{DC}$ is described herein with reference to FIGS. 3 and 4.

According to further preferred embodiments of the present invention, the current controller 37 receives the d-axis current command $i_d^*$ and the q-axis current command $i_q^*$, output from the current command generator 35, and the d-axis feedback current $i_d$ and the q-axis feedback current $i_q$, output from the three-phase/d-q coordinate converter 33, and generates the d-axis voltage command $V_d^*$ and the q-axis voltage command $V_q^*$ based on the same. Preferably, the motor rotational speed $\omega_{rpm}$ output from the angular speed calculator 31 may be further used to calculate the d-axis current command $i_d^*$ and the q-axis current command $i_q^*$.

According to other further preferred embodiments, the d-q/three-phase coordinate converter 39 suitably converts the d-axis voltage command $V_d^*$ and the q-axis voltage command $V_q^*$, input from the current controller 37, into the three-phase voltage commands $V_u^*$, $V_v^*$ and $V_w^*$ using the absolute angular position θ input from the position detector 17.

As a result, the three-phase voltage commands $V_u^*$, $V_v^*$ and $V_w^*$ output from the d-q/three-phase coordinate converter 39 are input to a space vector PWM algorithm module to generate duties $D_u$, $D_v$, and $D_w$ for switch control signals, and the PWM inverter 13 controls the three-phase currents applied to the permanent magnet synchronous motor 11 based on the duties.

The coordinate conversion process of each coordinate converter, the duty generation using the space vector pulse width modulation, and the three-phase current control as well as the above-described voltage command calculation process are well known in the art to which the present invention pertains, a detailed description thereof will be omitted.

According to another further preferred embodiment, the process for calculating the compensated speed, performed by the voltage variation compensator 35a of the current command generator 35, is described with reference to FIGS. 3 and 4.

First, referring to FIG. 3, the current command generator 35 preferably includes the voltage variation compensator 35a which receives the torque command $T_e^*$, the motor rotational speed $\omega_{rpm}$, and the battery voltage $V_{DC}$ and suitably calculates the motor rotational speed, for which the voltage variation is suitably compensated, that is, the compensated speed $\omega_{rpm,Nom}$, based on the same.

According to preferred embodiments of the present invention, in order to suitably reflect the battery voltage variation during operation, the voltage variation compensator 35a of the current command generator 35 compensates for the voltage variation with respect to the input values of the current command map 36a and 36b using the battery voltage (DC link voltage) $V_{DC}$ detected by the voltage detector 23. Preferably, the voltage variation compensator 35a may be configured to suitably compensate for the voltage variation with respect to the motor rotational speed $\omega_{rpm}$ as the input value of the current map data.

In particular preferred embodiments, a motor speed normalization method according to the voltage variation is suitably employed in the present invention, and the battery voltage variation is suitably compensated by a motor speed normalization method, in which a weight is applied to each of the motor rotational speed, the torque command, and the battery voltage. As described herein, the battery voltage variation in the present invention is meant to refer to the variation of the battery voltage caused during operation on the basis of the DC voltage during mapping, that is, a reference voltage at which the current command map is set. Preferably, in setting the current command map, the reference voltage (hereinafter referred to as "map setting reference voltage") is generally determined as the lowest DC link voltage which meets the output specifications of the motor.

According to certain preferred embodiments and referring to FIG. 4, for example, parameter values required for the compensated speed calculation process performed by the voltage variation compensator should be predetermined.

According to the present invention, the parameter values required for the logic include a weight factor of application start speed $\omega_0$, a weight factor of speed $K_\omega$, a weight factor of torque command $K_T$, an operating weight factor $K_N$, and a compensation start voltage $V_0$, which are obtained from a previous test under various conditions and stored.

Accordingly, in a state where the parameter values are suitably predetermined, the motor rotational speed $\omega_{rpm}$ detected during the operation of the permanent magnet synchronous motor is suitably input from the angular speed calculator, the current DC voltage $V_{DC}$ is input from the voltage detector, and the torque command $T_e^*$ is input from the superior controller (S11). Preferably, it is determined whether the motor rotational speed $\omega_{rpm}$ needs the weight application (S12).

Accordingly, the detected motor rotational speed $\omega_{rpm}$ is compared with the weight factor of application start speed $\omega_0$ to determine whether the motor rotational speed $\omega_{rpm}$ corresponds to the weight application speed. Preferably, if the motor rotational speed $\omega_{rpm}$ is greater than the weight factor of application start speed $\omega_0$, it is determined that the motor rotational speed $\omega_{rpm}$ corresponds to the weight application speed, and the operating weight factor $K_N$ is suitably calculated by applying the respective weights $K_\omega$ and $K_T$ with respect to the rotational speed and the torque command from the following equation 1 (S13).

$$K_N = K_\omega(\omega_{rpm} - \omega_0) + K_T |T_e^*| \qquad \text{[Equation 1]}$$

Preferably, if the motor rotational speed $\omega_{rpm}$ is smaller than the weight factor of application start speed $\omega_0$, that is, if it is determined that the motor rotational speed $\omega_{rpm}$ does not correspond to the weight application condition, the operating weight factor becomes zero ($K_N = 0$) (S13').

Preferably, when the weight is suitably applied to each speed of the motor, it is not preferable in terms of operating efficiency. Therefore, an optimal threshold value to which the weight is to be applied is experimentally obtained considering the operating efficiency and the improvement of voltage utilization caused by the voltage variation compensation. Preferably, the optimal threshold value is set to be the weight factor of application start speed $\omega_0$ such that the weight may be applied only when it corresponds to the weight application condition.

Further, once the operating weight factor $K_N$ is suitably obtained in the above-described manner, the compensated speed $\omega_{rpm,Nom}$, for which the battery voltage variation is compensated, is calculated from the motor rotational speed $\omega_{rpm}$ using the battery voltage $V_{DC}$ and the map setting reference voltage $V_{DC,MAP}$ as well as the operating weight factor $K_N$.

In another exemplary embodiment of the present invention, it is suitably determined whether the voltage variation compensation is required based on the battery voltage, that is, the DC link voltage $V_{DC}$ detected by the voltage detector (S14). Preferably, if it is determined that the DC link voltage $V_{DC}$ needs the voltage variation compensation, the compensated speed $\omega_{rpm,Nom}$ according to the voltage variation is suitably calculated from a predetermined equation (S15 and S16).

According to further exemplary embodiments, in detail, the DC link voltage $V_{DC}$ is compared with the predetermined compensation start voltage $V_0$ to determine whether the voltage variation compensation is required. Preferably, if the DC link voltage $V_{DC}$ is greater than the compensation start voltage $V_0$, it is determined that the voltage variation compensation is required (S15), and the compensated speed $\omega_{rpm,Nom}$ according to voltage variations is obtained from a predetermined equation (S16).

For example, in exemplary embodiments, the above-described equation may be a motor speed normalization formula according to the voltage variation, and the motor speed normalization formula may be represented by the following equation 2:

$$\omega_{rpm,Nom} = \left[1 + F\left\{(1 + K_N)\frac{V_{DC,MAP}}{V_{DC}} - 1\right\}\right]\omega_{rpm} \qquad \text{[Equation 2]}$$

wherein $V_{DC,MAP}$ represents the map setting reference voltage.

In the above equation 2, F represents a flag in the logic indicative of whether or not the compensation is applied. If the DC link voltage $V_{DC}$ needs the voltage variation compensation, F corresponds to 1 (F=1)(S15), whereas, if the DC link voltage $V_{DC}$ does not need the voltage variation compensation, F corresponds to zero (F=0)(S15').

Equation 2 is used to calculate the normalized motor speed $\omega_{rpm,Nom}$ using the operating weight factor $K_N$ calculated from equation 1, the detected DC link voltage $V_{DC}$, and the motor rotational speed $\omega_{rpm}$ as input variables. The normalized motor speed $\omega_{rpm,Nom}$ calculated by equation 2 corresponds to the compensated speed which is input to the current command map. The compensated speed corresponds to a speed value, for which the voltage variation is compensated, from the motor rotational speed $\omega_{rpm}$ input from the angular speed calculator.

However, if the DC link voltage $V_{DC}$ is smaller than the compensation start voltage $V_0$, F corresponds to zero (F=0) in equation 2. Accordingly, the current motor rotational speed $\omega_{rpm}$ is used as an input of the current command map data, instead of the compensated speed.

According to further embodiments, the compensation start voltage $V_0$ is set by obtaining an optimal threshold voltage for determining whether the compensation is required from the previous test, considering the improvement of voltage utilization caused by the voltage variation compensation.

Consequently, according to preferred embodiments of the present invention, the compensated motor rotational speed $\omega_{rpm,Nom}$, i.e., the compensated speed, is used as an input of the d-axis current command map 36a and the q-axis current command map 36b together with the torque command Te* to obtain the d-axis and q-axis commands (see FIG. 3). Preferably, when the d-axis and q-axis current commands, in which the voltage variation is suitably reflected, are obtained, they are used to control the permanent magnet synchronous motor.

As described herein, according to the method for controlling the permanent magnet synchronous motor of the present invention, the battery voltage variation can be suitably reflected in real time in controlling the permanent magnet synchronous motor, which improves the voltage utilization of the motor-inverter system and, in turn, improves the vehicle performance (such as power efficiency, fuel efficiency, and the like).

Moreover, it is possible to ensure the stability of the current control in high-voltage and high-speed operation range, reduce the amount of data for generating current commands and the data storage, and save manpower and time required for data construction and verification, compared to the conventional method for performing the linear interpolation using the current command map for each voltage step up to the maximum voltage.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalent.

What is claimed is:

1. A method for controlling a permanent magnet synchronous motor, the method comprising:
    detecting an absolute angular position of a permanent magnet synchronous motor;
    calculating a rotational speed of the permanent magnet synchronous motor based on the detected absolute angular position;
    detecting a voltage of a battery as a power source;
    calculating a compensated speed, for which a battery voltage variation is compensated, from the rotational speed of the permanent magnet synchronous motor based on a torque command, the rotational speed of the permanent magnet synchronous motor, and the battery voltage;
    generating a d-axis current command and a q-axis current command corresponding to the torque command and the compensated speed using a predetermined current command map;
    converting three-phase currents flowing into the permanent magnet synchronous motor into a d-axis feedback current and a q-axis feedback current based on the detected absolute angular position;
    calculating a d-axis voltage command and a q-axis voltage command based on the d-axis current command, the q-axis current command, the d-axis feedback current, and the q-axis feedback current;
    converting the d-axis voltage command and the q-axis voltage command into three-phase voltage commands based on the detected absolute angular position; and
    controlling the operation of the permanent magnet synchronous motor based on the three-phase voltage commands,
    wherein the calculating the compensated speed comprises:
    determining whether the rotational speed of the permanent magnet synchronous motor is greater than a predetermined weight application speed;
    calculating an operating weight factor by applying a weight to the rotational speed and the torque command, if the rotational speed of the permanent magnet synchronous motor is greater than the weight application speed; and
    calculating the compensated speed, for which a battery voltage variation is compensated, from the rotational speed of the permanent magnet synchronous motor based on the operating weight factor and a reference voltage used when the current command map is set.

2. The method of claim 1, wherein the operating weight factor is calculated by the following equation E1 based on predetermined speed weightweight factor of speed and weight factor of torque command weight:

$$K_N = K_\omega(\omega_{rpm} - \omega_0) + K_T|T_e^*| \quad \text{E1:}$$

wherein KN represents the operating weight factor, Kω represents the speed weightweight factor of speed, ωrpm represents the motor rotational speed, ω0 represents the weight factor of application start speed, KT represents the weight factor of torque command weight, and Te* represents the torque command.

3. The method of claim 1, wherein the operating weight factor is zero if the rotational speed of the permanent magnet synchronous motor is smaller than the weight application speed.

4. The method of claim 1, wherein the calculation the compensated speed further comprises determining whether the battery voltage is greater than a predetermined compensation starting voltage,
    wherein if the battery voltage is greater than the compensation starting voltage, the compensated speed is calculated and used as an input of the current command map data, and if the battery voltage is smaller than the compensation starting voltage, the rotational speed of the permanent magnet synchronous motor is used as an input of the current command map data instead of the compensated speed.

5. The method of claim 1, wherein the compensated speed is calculated by a motor speed normalization formula in which the operating weight factor, the battery voltage, and the rotational speed of the permanent magnet synchronous motor are used as input variables.

6. The method of claim 5, wherein the compensated speed is a normalized motor speed calculated by the motor speed normalization formula represented by the following equation E2:

$$\omega_{rpm,Nom} = \left[1 + F\left\{(1 + K_N)\frac{V_{DC,MAP}}{V_{DC}} - 1\right\}\right]\omega_{rpm} \qquad \text{E2}$$

wherein $\omega rpm,Nom$ represents the normalized motor speed, KN represents the operating weight factor, VDC,MAP represents the reference voltage used when the map is set, VDC represents the battery voltage, and F is equal to 1(VDC≥V0) or 0(VDC<V0), in which, VDC represents the battery voltage and V0 represents the compensation start voltage.

\* \* \* \* \*